United States Patent [19]

Meslener

[11] 3,713,140

[45] Jan. 23, 1973

[54] DECODER FOR DELAY MODULATION SIGNALS

[75] Inventor: George John Meslener, Acton, Mass.

[73] Assignee: RCA Corp.

[22] Filed: Oct. 8, 1970

[21] Appl. No.: 79,190

[52] U.S. Cl.........340/347 DD, 329/107, 340/174.1 R

[51] Int. Cl...............................................H03k 13/24

[58] Field of Search..325/38 A, 41, 42; 340/347 DD, 340/174.1; 329/109, 107, 106; 324/77 A

[56] References Cited

UNITED STATES PATENTS

| | | | |
|---|---|---|---|
| 3,414,894 | 12/1968 | Jacoby | 340/347 DD |
| 3,514,706 | 5/1970 | Dupraz et al. | 340/347 DD |
| 3,271,750 | 9/1966 | Padalino | 329/107 X |
| 3,383,600 | 5/1968 | Calfee | 325/42 X |
| 3,568,147 | 3/1971 | Gilson | 325/42 X |

*Primary Examiner*—Maynard R. Wilbur
*Assistant Examiner*—Leo H. Boudreau
*Attorney*—H. Christoffersen

[57] ABSTRACT

A decoder is disclosed for a binary bit stream in which a transition occurs at the middle of a bit cell containing a "1," and a transition occurs at the partition between adjacent bit cells containing "0's." A reference wave derived from the bit stream and having a period equal to a bit-cell width, and the binary bit stream, are applied to a multiplier to produce a product wave. The product wave is translated by integrate-and-dump circuits, or by a low-pass filter, to a modified product wave in which low-frequency components are predominant. A first comparator means produces a "1" output when the portion of the modified product wave corresponding to a bit cell is more positive or more negative than the portions of the modified product wave corresponding to both the preceding and following bit cells. A second comparator means produces a "1" output when the portion of the modified product wave corresponding to a bit cell has a larger absolute value than the portion of the modified product wave corresponding to the unit preceding the center of the bit cell and the unit following the center of the bit cell.

1 Claim, 9 Drawing Figures

INVENTOR.
GEORGE J. MESLENER
BY
Carl V. Olson
Attorney

INVENTOR.
GEORGE J. MESLENER
BY
Carl V. Olson
Attorney

INVENTOR.
GEORGE J. MESLENER
BY
Carl V. Olson
Attorney

INVENTOR.
GEORGE J. MESLENER
BY
Carl V. Olson
Attorney

INVENTOR.
GEORGE J. MESLENER
BY Carl V. Olson
Attorney

INVENTOR.
GEORGE J. MESLENER
BY
Carl V. Olson
Attorney

INVENTOR.
GEORGE J. MESLENER
BY Carl V. Olson
Attorney

INVENTOR.
GEORGE J. MESLENER
BY
Carl V. Olson
Attorney

DECODER FOR DELAY MODULATION SIGNALS

BACKGROUND OF THE INVENTION

This invention relates to digital information code converters or decoders for translating an information signal in one form especially suited for recording to another form especially suited for handling by electronic circuitry. A known form of signal for recording is a self-clocking type signal in which a transition occurs in the middle of a bit cell representing a "1" and a transition occurs between bit cells representing two successive "0's."

The above-described signal is in a form or code which is particularly well suited for use in serial type recording and reproducing systems. This is so because the signal itself includes transitions which, when the signal is reproduced, can be extracted to produce a clocking or timing wave, and because the signal includes relatively few transitions so that information can be densely packed on the recording medium. A decoder or converter is normally used to translate the signal reproduced from the recording medium to a simple non-return-to-zero (NRZ) signal and a clock pulse wave suitable for application to the signal input and the shift input, respectively, of a conventional shift register.

A digital information signal in which a "1" is represented by a transition in the middle of a bit cell (a "0" is represented by the absence of a transition at the middle of a bit cell), and in which two successive bit cells both containing "0's" are separated by an intervening partition or clock transition, is sometimes called a delay modulation signal. This is because the decoder includes means to compare the signal with a delayed version of the signal to determine whether there was an intervening transition. The assignment of "1" and "0" meanings is purely arbitrary and may be reversed. The coding system herein called "delay modulation" is also known as "modified frequency modulation" and "time modulation."

Decoders for translation a delay modulation signal read from a magnetic medium to an NRZ signal suitable for use by a computer processor are described in U.S. Pat. No. 3,414,894, issued on Dec. 3, 1968 to G. V. Jacoby and U.S. Pat. No. 3,452,348 issued on June 24, 1969 to J. A. Vallee. While decoders of the type described are entirely satisfactory at the present time, the demand exists for decoders capable of correctly responding to signals derived from magnetic mediums on which information is more densely packed, such as at a density of 4,400 bits per inch of magnetic track on a disc or drum which moves at a rate of about 2,000 inches per second.

SUMMARY OF THE INVENTION

According to an embodiment of the invention, a binary information bit stream derived from a delay modulation magnetic recording is multiplied with a periodic reference signal to produce a product wave. The reference wave is synchronized from the information bit stream and has a period equal to the bit-cell width of the bit stream. The product wave is modified to emphasize low frequency components thereof. Bit-cell-wide units of the modified product wave are applied to comparators and logic gates to derive the binary information in the form of an NRZ signal.

Figure 7:
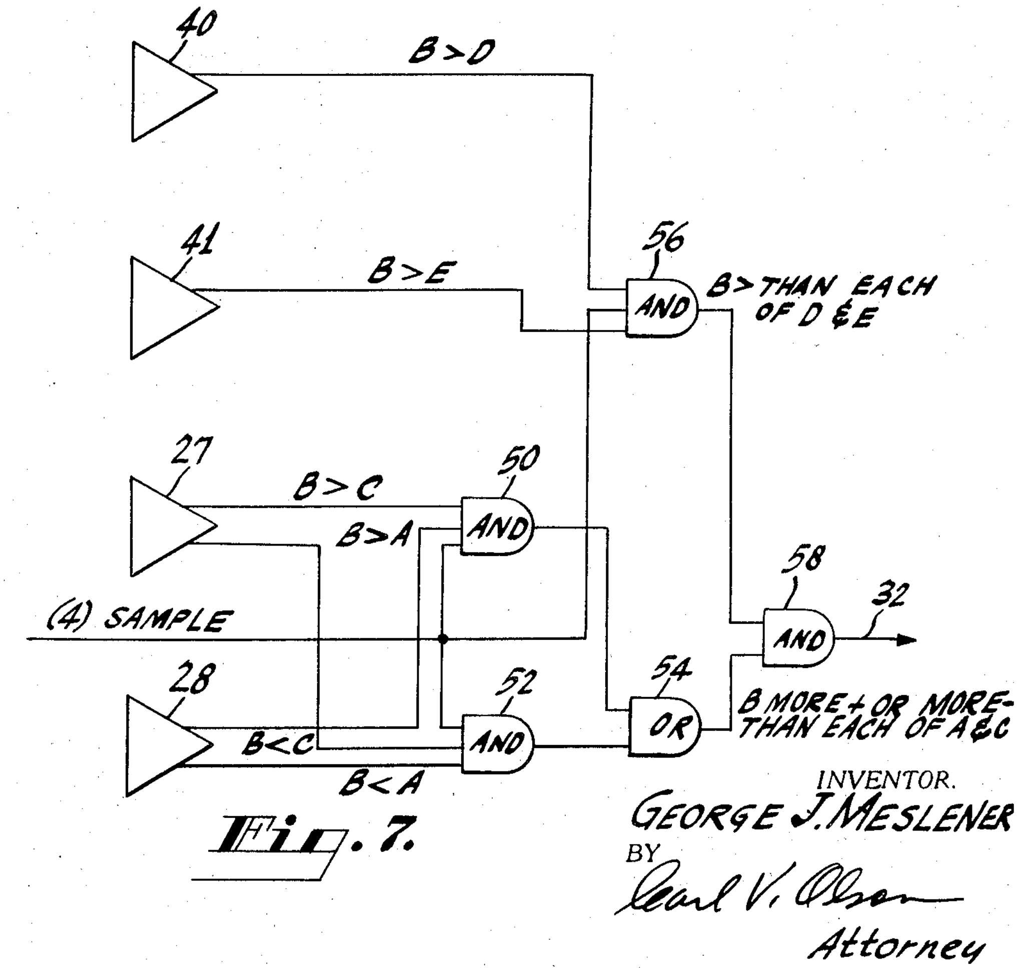
Figure 3:
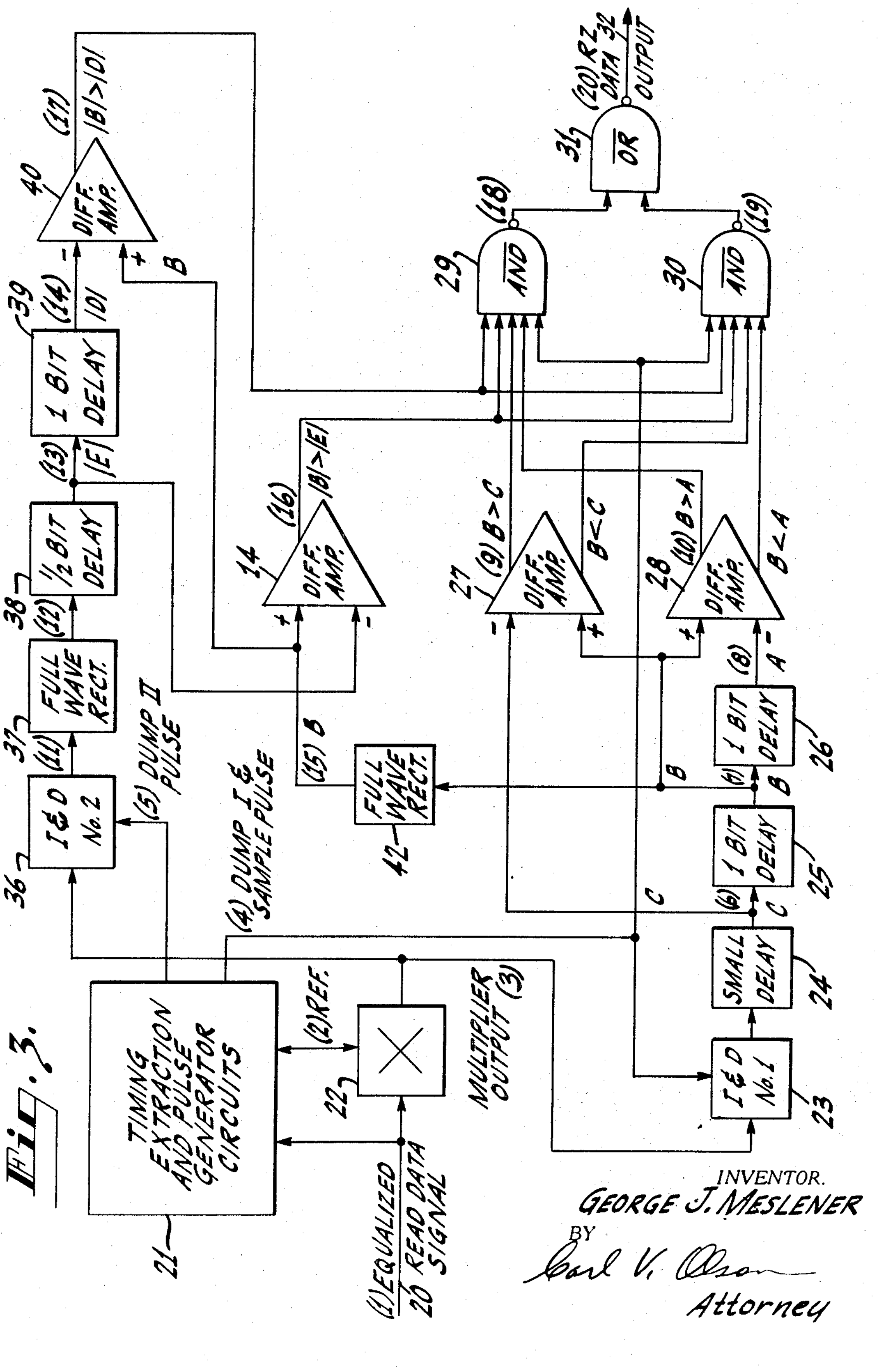
FIG. 3 is a diagram of an exemplary decoder including integrate-and-dump circuits.
Figure 5:
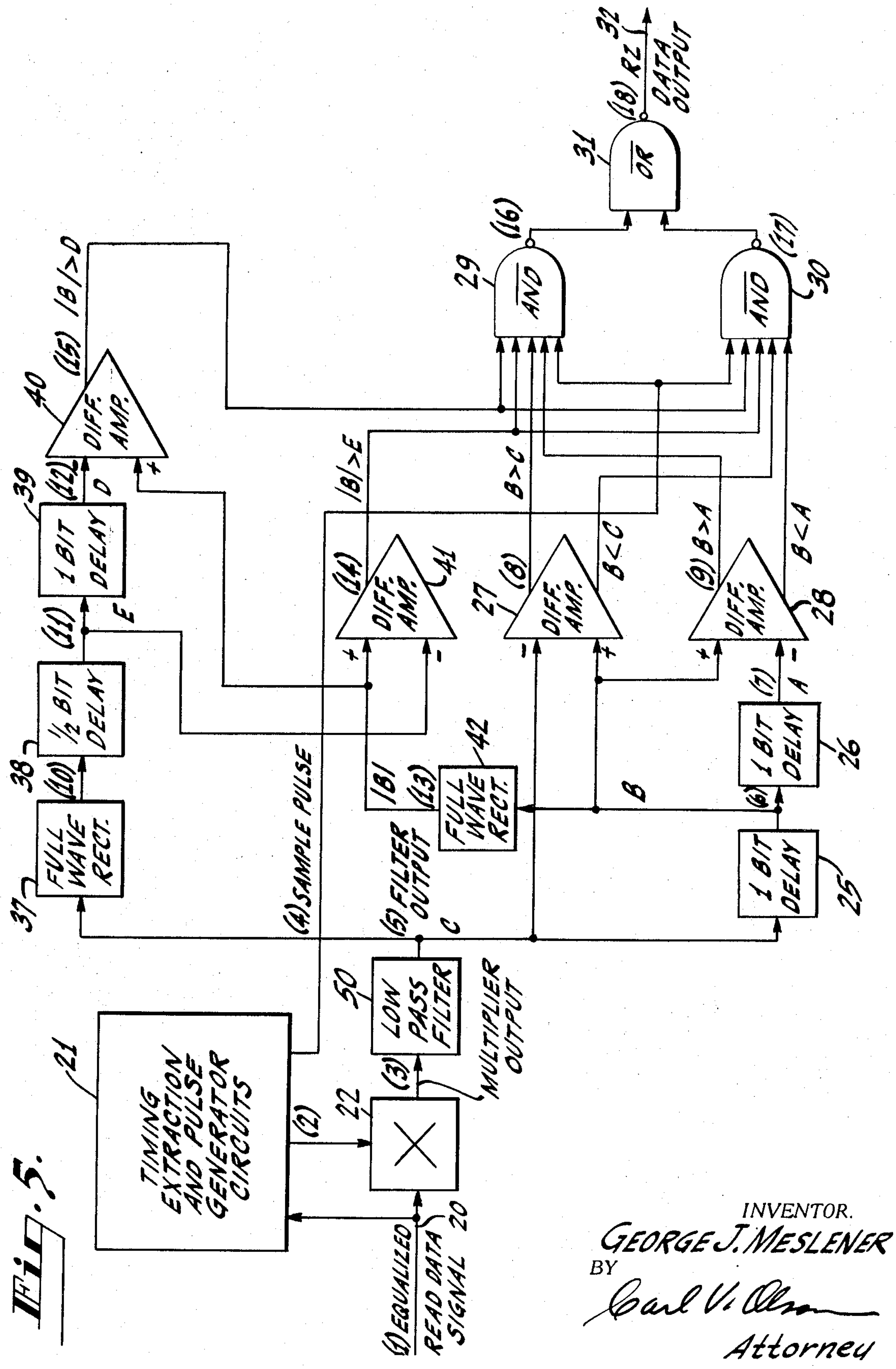

FIGS. **4*a* and 4*b* are charts of voltage waveforms which will be referred to in describing the operation of the decoder shown in FIG. 3**;

FIG. 5 is a diagram of another exemplary decoder including a low-pass filter;

FIGS. **6*a* and 6*b* are charts of voltage waveforms which will be referred to in describing the operation of the decoder shown in FIG. 5; and FIG. 7 is a diagram of an alternative arrangement of logic gates that may be substituted for gates 29, 30 and 31 in FIGS. 3 and 5**.

DETAILED DESCRIPTION OF THE DRAWING

Figure 1:
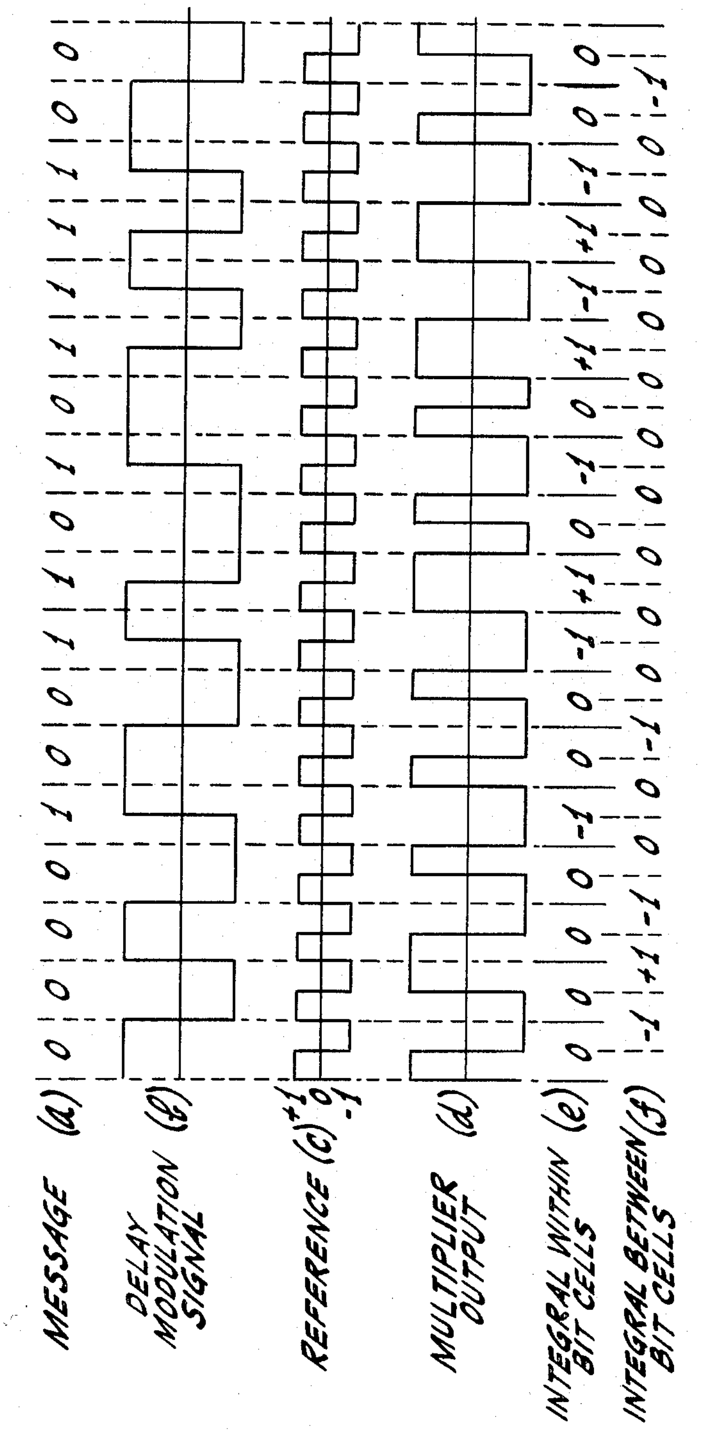
FIG. 1 is a chart of voltage waveforms which will be referred to in describing the underlying principles of the invention.

Referring now in greater detail to FIG. 1, there is shown a stream of "1" and "0" information bits at (a), and a corresponding delay modulation signal at (b). The signal (b) may be reproduced from a magnetic recording, and it follows the rules of delay modulation in that a transition occurs at the middle of every bit cell containing a "1," and in that a transition occurs between bit cells containing successive "0's." A reference signal (c) is derived from the self-clocking delay modulation signal (b). The reference signal (c) is a square wave having a period equal to the bit-cell width of the delay modulation signal and is synchronous therewith. The reference wave is generated, in the usual manner of generating a timing wave, by means of a phase locked oscillator having an approximately correct natural frequency, and by applying synchronizing pulses derived from the delay modulation signal to the frequency control circuit of the oscillator.

The delay modulation signal (b) and the reference signal (c) are multiplied to produce a product wave. The multiplier may be diode quad, a phase detector or a balanced modulator. The product wave is applied to a first integrator which produces the integral of the product wave having values during each successive bit-cell period as shown on line (e) of FIG. 1. The product wave is also applied to a second integrator which produces the integral during each period extending from the center of one bit cell to the center of the next bit cell, and having values as shown on line (f) in FIG. 1.

Figure 2:
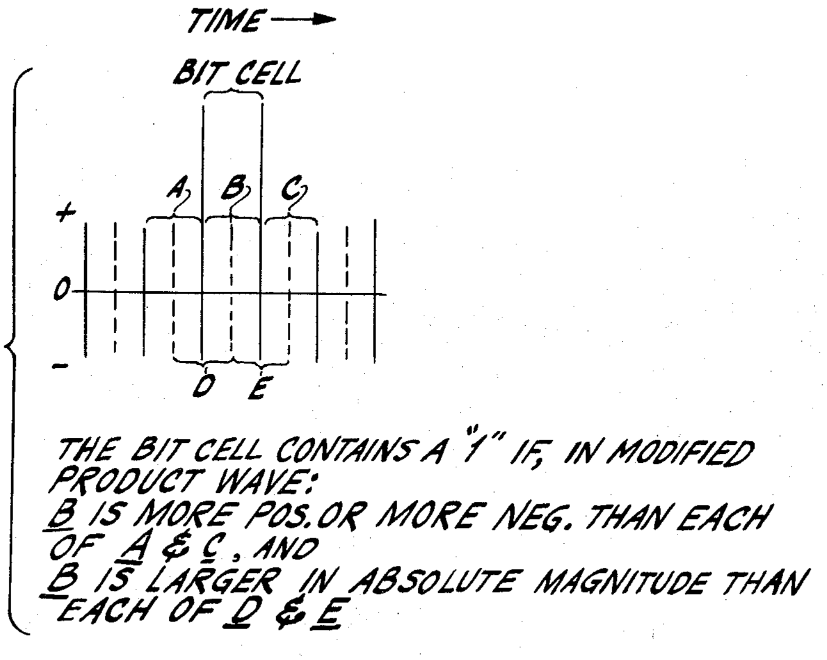
FIG. 2 is a chart which will be referred to in describing units of a product wave from a multiplier which are integrated and compared with each other to derive an output NRZ signal.

The values of the integrals shown in lines (e) and (f) of FIG. 1 are compared and analyzed in logic circuits to detect the bit cells which contain "1's." The comparisons are performed in a manner illustrated in FIG. 2, where B represents the integral of a given bit cell being detected, A represents the integral of the preceding bit cell, C represents the integral of the following bit cell, D represents the integral of a unit extending from the center of the bit cell B to the center of the preceding bit cell A, and E represents the integral of a unit extending from the center of bit cell B to the center of the following bit cell C.

The comparison logic generates a "1" signal output for a given bit cell if the integral of the product wave during period B is *more positive* than the integrals during the preceding period A and during the following period C; or, if the integral of the product wave during the period B is *more negative* than the integrals during the preceding period A and during the following period C; and, if the integral during the period B is *larger* in absolute value (regardless of polarity) than the integrals during each of the periods D and E.

Figure 4A:
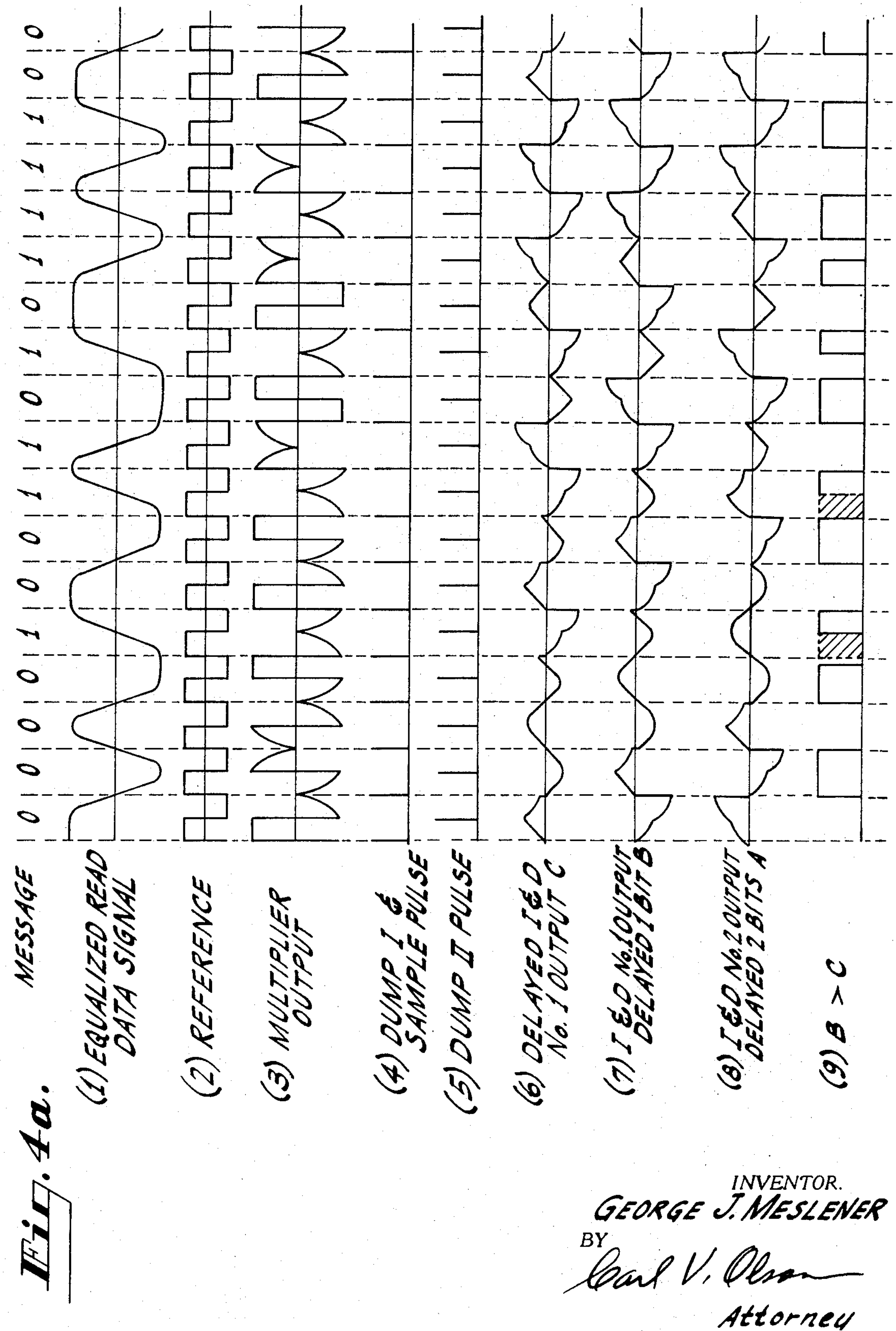
Figure 4B:
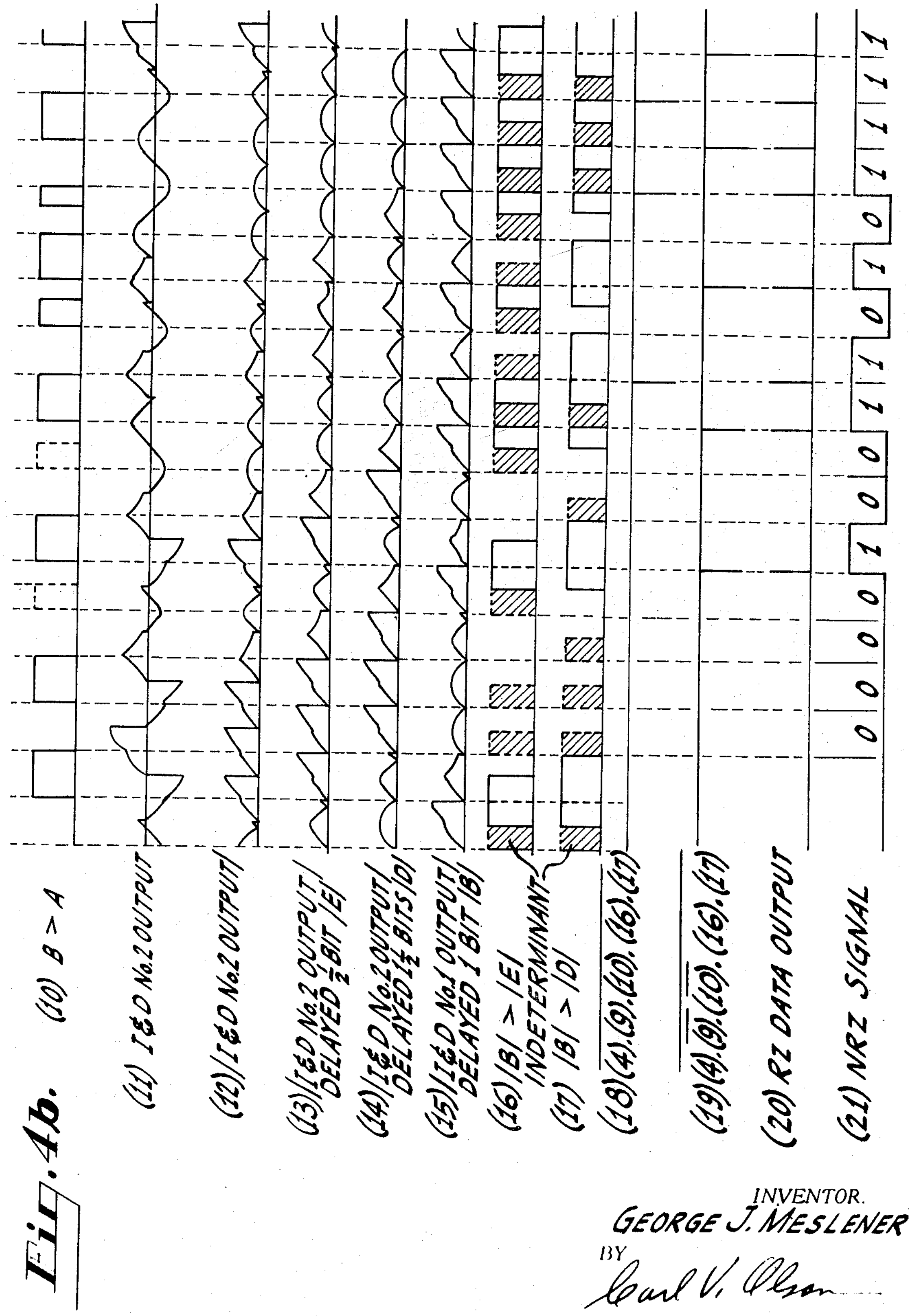

Reference is now made to FIGS. 3, 4*a*, and 4*b* for a description of an exemplary circuit which performs the functions described in connection with FIGS. 1 and 2 in decoding a delay modulation input signal and providing an output pulse for every bit cell containing a "1" information bit. A signal input line 20 is connected to timing extraction and pulse generator circuits 21 and to a multiplier 22. The timing extraction circuit is conventional and may be as described in U.S. Pat. Nos. 3,452,348 issued on June 24, 1969, and 3,493,962 issued on Feb. 3, 1970, both to J. A. Vallee. The circuits 21 also include a conventional square wave oscillator synchronized from an input signal such as shown in FIG. 4*a*(1) and having a reference square wave output as shown in FIG. 4*a*(2). The circuits 21 also include conventional pulse generators producing pulse waves as shown in lines (4) and (5) in FIG. 4a.

The multiplier 22 may be any known multiplier device, and is preferably a diode quad, a phase detector or a balanced modulator, since one of the input signals, the reference signal (2) of FIG. 4*a* is a binary signal. These multipliers preserve all of the information contained in the input signal (1) of FIG. 4*a*.

The product signal output of multiplier 22 is coupled to a first integrate-and-dump circuit 23 which integrates the product signal over a bit cell time period as controlled by the "dump" pulse wave, FIG. 4*a* (4), from circuits 21. (The integrate-and-dump circuits herein may be replaced by a low-pass filter as will be described in connection with FIGS. 5 and 6.) The output of integrator 23 is given a small delay in delay device 24 about equal to the width of the dump pulse and then appears as shown in FIG. 4a (6). This slightly delayed signal is applied to a one-bit delay device 25 providing the signal (7) in FIG. 4*a*, which is then applied to a second one-bit delay device 26 providing the signal (8) in FIG. 4a. Due to the operation of the delay devices, the signal (7) at a given time represents a given bit cell at the same instant the signal (8) represents a preceding bit cell and the signal (6) represents a following bit cell in the bit stream. The signals (8), (7), and (6) correspond in FIG. 2 with bit cells A, B and C, respectively. The signals are integrals, taken over bit cell periods, of the product wave, and are modified versions, in which low-frequency components are predominent, of the product wave (3).

A differential amplifier comparator 27 receives signals B and C, and produces an output when B is *more positive* than C, as shown on line (9) in FIG. 4*a*. The shaded areas represent indeterminate conditions. A differential amplifier comparator 28 receives signals B and A, and produces an output when B is *more positive* than A, as shown on line (10) in FIG. 4*b*. The outputs of differential amplifiers 27 and 28, including inverted outputs, are applied to inputs of NAND-gates 29 and 30. The Nand gates also are supplied with the sampling pulse (4) from timing circuits 21. The outputs of Nand gates 29 and 30 are applied to inputs of a NOR-gate 31.

A second integrate-and-dump circuit 36 also receives the product signal (3) from the multiplier 22, and receives a dump II pulse wave (5) from the timing extraction and pulse generator circuits 21. The second integrator 36 produces an output (11) in FIG. 4*b* which is rectified in a full wave rectifier 37 to produce a rectified signal (12) in FIG. 4*b*. The signal (12) is applied through a one-half bit cell delay device 38 providing a signal (13), which is applied through a one-bit-cell delay device 39 to produce a signal (14) delayed a total of 1½ bit cell widths. As shown in FIG. 2, the signal (14) at a given time represents a unit D of the signal at the same time that signal (13) represents a unit E of the signal derived from the same input bit stream signal.

The delay devices 38 and 39 operate so that at the same time that the bit cell signal B occurs, there is present a signal unit D extending from the middle of bit cell B to the middle of the preceding bit cell A, and there is also simultaneously present a signal unit E extending from the middle of bit cell B to the middle of the following bit cell C. All of the simultaneously available integrals for the bit cells A, B, and C, and the units D and E are compared at the time of sample pulse (4) and processed in accordance with the rules listed in FIG. 2 to determine whether the bit cell B contains a "1."

The output (14) of delay device 39 is applied to a differential amplifier comparator 40. The comparator 40 also receives a rectified version (15) of the signal (7) provided by a full-wave rectifier 42. The comparator 40 provides an output (17) when the *amplitude* of the integral B is greater than the amplitude of the integral D. This is because the signals compared have been passed through full-wave rectifiers 37 and 42 and therefore both have the same positive polarity. Another comparator 41 receives the rectified signal (%) from full-wave rectifier 42 and the rectified signal (13) from delay device 38. Comparator 41 provides an output (16) when the *amplitude* of B is greater than the amplitude of E.

The outputs · the four comparators 40, 41, 27 and 28, and the sample pulse wave (4) are applied to NAND-gate 29 with connections to satisfy the logic expression $\overline{(4)\cdot(9)\cdot(10)\cdot(16)\cdot(17)}$ and to produce an output wave shown in line 18 of FIG. 4b, and are applied to Nand gate 30 with connections to satisfy the logic expression $\overline{(4)\cdot\overline{(9)}\cdot\overline{(10)}\cdot(16)\cdot(17)}$ and to produce an output wave shown in line 19 of FIG. 4*b*.

In words, gate 29 provides an output (18) when: B is more positive that A, B is more positive than C, B is larger than B, and B is larger than E. -Gate 30 provides an output (19) when: B is more negative than A, B is more negative than C, B is larger than D, and B is larger than E. The two outputs (18) and (19) are applied to the NOR-gate 31 to produce the output wave (20) in FIG. 4*b*. The output wave (20) contains a pulse for every "1" information bit in the input signal (1). The pulses in output (20) are necessarily delayed in time an amount equal to at least one-bit-cell width following the bit cell of the input wave. The RZ (return-to-zero) pulse wave (20) is easily translated by conventional means (not shown) to a NRZ (non-return-to-zero) signal as shown in line (21) of FIG. 4*b*.

The described coherent or synchronous decoder operates in a particularly reliable manner because it is relatively immune to the data-dependent signal level shifts that produce false zero crossings and adversely affect the accuracy of previously known amplitude sensing decoders. The input signal is multiplied with a synchronous reference wave to produce a product wave, which is then integrated over periods equal to a bit-cell width. Comparators and logic gates operate on the integrals in accordance with the rules given in FIG. 2 and produce the desired NRZ output wave.

Figure 6A:
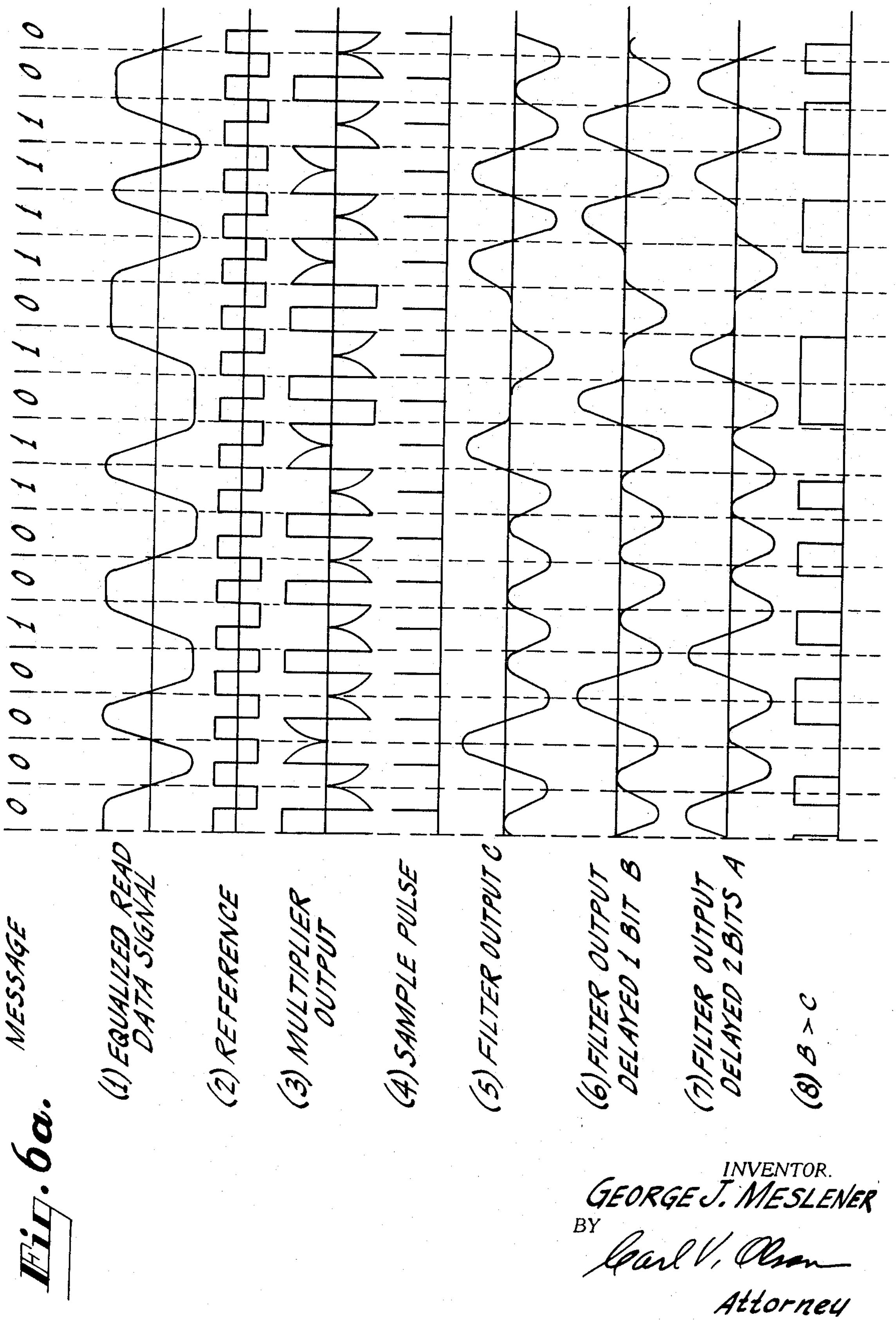
Figure 6B:
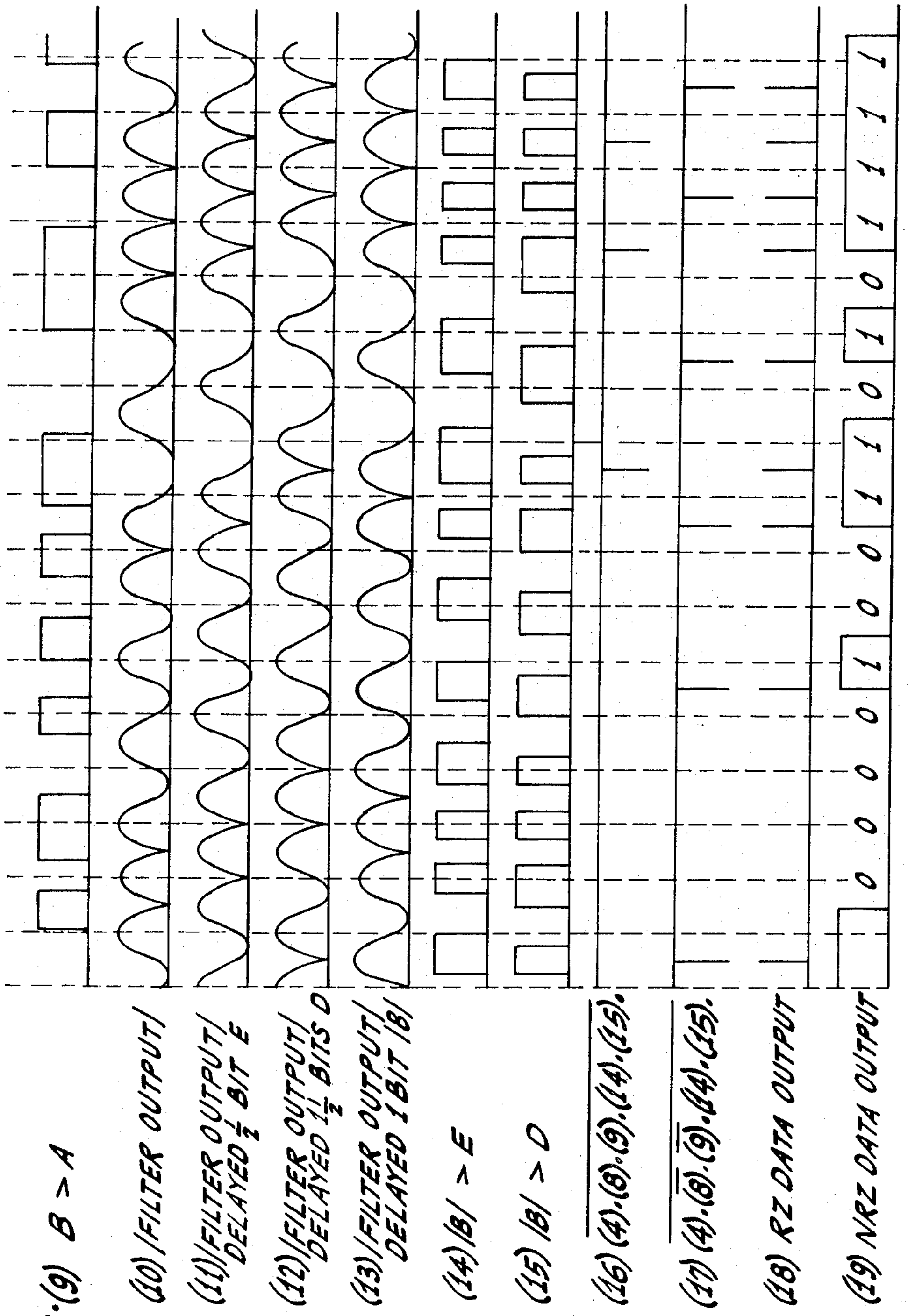

Reference is now made to FIGS. 5, 6*a*, and 6*b* for a description of another exemplary circuit which differs from the arrangement of FIGS. 3 and 4 in that it includes a low-pass filter instead of integrate-and-dump circuits. Corresponding elements are given the same numerals as in FIG. 3. A signal input line 20 is connected to timing extraction and pulse generator circuits 21 and to a multiplier 22. The circuits 21 include a conventional square wave oscillator synchronized from an input signal such as shown in FIG. 6*a* (1) and having a reference square wave output as shown in FIG. 6*a* (2). The circuits 21 also include a conventional pulse generator producing a pulse wave as shown in line (4) in FIG. 6*a*.

The multiplier 22 may be any known multiplier device, and is preferably a diode quad, a phase detector or a balanced modulator, since one of the input signals, the reference signal (2) of FIG. 6*a* is a binary signal. These multipliers preserve all of the information contained in the input signal (1) of FIG. 6*a*.

The product signal output of multiplier 22 is coupled to a low-pass filter 50 which translates the product wave (3) in FIG. 6*a* to a modified product wave (5) in which the low frequency components are predominant. The modified product wave is applied to the inputs of full-wave rectifier 37, and to the one-bit-cell delay device 25. The output of delay device 25 shown on line (6) of FIG. 6*a* is delayed an additional one-bit-cell width by a second one-bit delay device 26 to provide the signal (7) in FIG. 6*a*. Due to the operation of the delay devices, the modified product wave signal (6) at a given time corresponds with a given bit cell at the same instant that the signal (7) corresponds with a preceding bit cell and the signal (5) corresponds with a following bit cell in the bit stream. The signals (7), (6) and (5) at a given time correspond in FIG. 2 with bit cells A, B, and C, respectively.

A differential amplifier comparator 27 receives signals B and C, and produces an output when B is *more positive* than C, as shown on line (8) in FIG. 6*a*. A differential amplifier compartor 28 receives signals B and A, and produces an output when B is *more positive* than A, as shown on line (9) in FIG. 6*b*. The outputs of differential amplifiers 27 and 28, including inverted outputs, are applied to inputs of NAND-gates 29 and 30. The Nand gates also are supplied with the sampling pulse (4) from timing circuits 21. The outputs of NAND-gates 29 and 30 are applied to inputs of a NOR-gate 31.

The modified product wave (5) from low-pass filter 50 is also applied to a full wave rectifier 37 to produce a rectified signal (10) in FIG. 6*b*. The signal (10) is applied through a one-half bit cell delay device 38 providing a signal (11), which is applied through a one-bit-cell delay device 39 to produce a signal (12) delay a total of 1½ bit-cell widths. The signal (12) at a given time represents a unit D (as shown in FIG. 2) of the signal at the same time that signal (11) represents a unit E of the signal derived from the same input bit stream signal (1).

The delay devices 38 and 39 operate so that at the same time that the bit cell signal B occurs, there is present a signal unit D extending from the middle of bit cell B to the middle of the preceding bit cell A, and there is also simultaneously present a signal unit E extending from the middle of bit delayed B to the middle of the following bit cell C. All of the simultaneously available signals for the centers of the bit cells A, B, and C, and the units D and E are compared and processed in accordance with the rules listed in FIG. 2 to determine whether the bit cell B contains a "1."

The output (12) of delay device 39 is applied to a differential amplifier comparator 40. The comparator 40 also receives a rectified version (13) of the signal (6) provided by a full-wave rectifier 42. The comparator 40 provides an output (15) when the absolute amplitude of the signal representing bit cell B is greater than the amplitude of the signal representing unit D. This is because the signals compared have been passed through full wave rectifiers 37 and 42 and therefore both have the same positive polarity. Another comparator 41 receives the rectified signal (13) from full wave rectifier 42 and the rectified signal (11) from delay device 38. Comparator 41 provides an output (14) when the absolute amplitude of B is greater than the amplitude of E.

The outputs of the four comparators 40, 41, 27, and 28, and the sample pulse wave (4) are applied to NAND-gate 29 with connections to satisfy the logic expression $\overline{(4)\cdot(9)\cdot(10)\cdot(16)\cdot(17)}$ and to produce an output wave shown in line (16) of FIG. 6*b*, and are applied to NAND-gate 30 with connections to satisfy the logic expression $\overline{(4)\cdot\overline{(9)}\cdot\overline{(10)}\cdot(16)\cdot(17)}$ and to produce an output wave shown in line (17) of FIG. 6*b*. In words, gate 29 provides an output (18) when: B is more positive than A, B is more positive than C, B is larger than D, and B is larger than E. gate 30 provides an output (19) when : B is more negative than A, B is more negative than C, B is larger than D, and B is larger than E. The two outputs (16) and (17) are applied to the NOR-gate 31 to produce the output wave (18) in FIG. 6*b*. The output wave (18) contains a pulse for every "1" information bit in the input signal (1). The pulses in output (18) are necessarily delayed in time an amount equal to at least one-bit-cell width following the bit cell of the input wave. Thr RZ (return-to-zero) pulse wave (18) is easily translated by conventional means (not shown) to a NRZ (non-return-to-zero) signal as shown in line (19) of FIG. 6*b*.

In the described coherent or synchronous decoder of FIG. 5, the input signal is multiplied with a synchronous reference wave to produce a product wave, which is then passed through a low-pass filter to produce a modified product wave, which is in turn subjected to various delays. Comparators and logic gates operate on the various versions of the modified product wave in accordance with the rules given in FIG. 2 and produce the desired NRZ output wave.

The logic gates 29, 30, and 31 in FIGS. 3 and 5 represent one of many possible logic configurations for satisfying the rules set forth in FIG. 2. An alternative arrangement of gates is shown in FIG. 7 in which an And gate 50 produces an output when B is more positive then each of A and C. An And gate 52 produces an output when B is more negative than each of A and C. An OR-gate 54 having inputs from gates 50 and 52 produces an output when B is more positive, or more negative, than each of A and C. Stated another way, OR-gate 54 provides a "1" -indicating output when there is a voltage difference of the same polarity between the center of a bit cell B and the centers of preceding and following bit cells A and C.

In FIG. 7, an And gate 56 produces an output when B is larger in magnitude than each of D and E. Stated another way, AND-gate 56 produces a "1" -indicating output when there is a voltage difference between the center of a bit cell B and each of the two edges of the bit cell.

OR-gate 54 and AND-gate 56 supply inputs to an AND-gate 58 which provides a "1" output signal on output lead 32 whenever a "1" -indicating input is received from both the OR-gate 54 and the AND-gate 56. This construction performs the same logic function as the corresponding logic elements in FIGS. 3 and 5.

What is claimed is:

1. A decoder responsive to a binary bit stream in which a transition occurs at the middle of a bit cell containing a "1," and a transition occurs at the partition between adjacent bit cells containing "0's," and a reference square wave, having a period equal to a bit-cell width, derived from said binary bit stream, comprising means to multiply the binary bit stream and the reference square wave to produce a product wave, a low-pass filter receptive to said product wave and producing a filtered output wave, means to sample the filtered wave at the center of a bit cell and the centers of preceding and following bit cells, and to produce an output when there is a voltage difference of the same polarity between the center of a bit cell and the centers of preceding and following bit cells, means to full-wave rectify the filtered output wave, means to sample the rectified wave at the center and at both edges of a bit cell, and to produce an output when there is a voltage difference between the center of a bit cell and each of the two edges of the bit cell, and means to combine the outputs produced by said two means to sample the filtered wave to produce a "1" output signal.

* * * * *